R. DE LAN.
LID FOR COOKING UTENSILS.
APPLICATION FILED MAR. 24, 1916.
1,227,251.
Patented May 22, 1917.
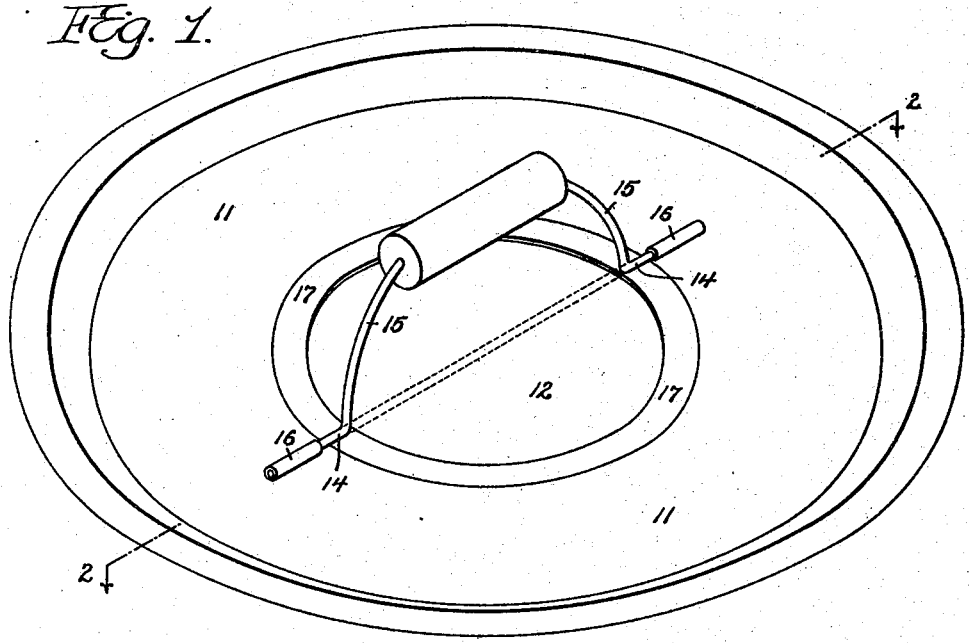
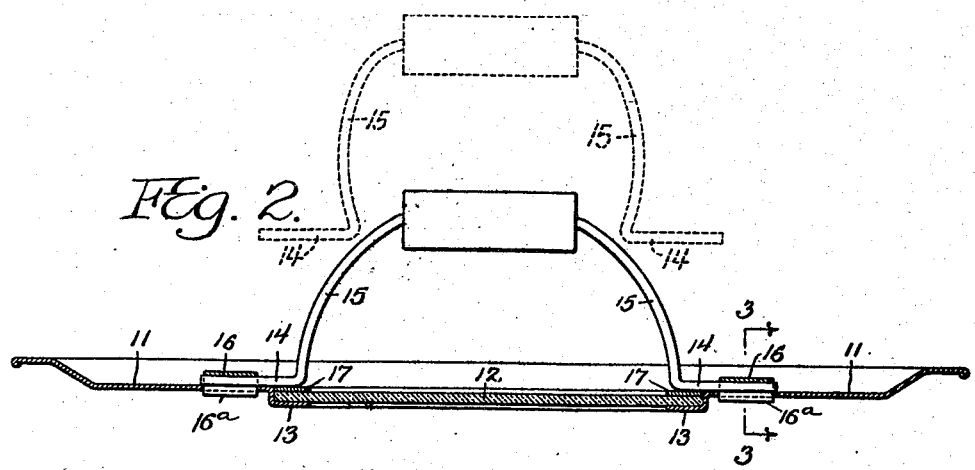
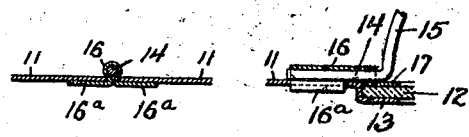
INVENTR
RICHIE DE LAN
BY HIS ATTORNEY

UNITED STATES PATENT OFFICE.

RICHIE DE LAN, OF PHILADELPHIA, PENNSYLVANIA.

LID FOR COOKING UTENSILS.

1,227,251.  Specification of Letters Patent.  Patented May 22, 1917.

Application filed March 24, 1916. Serial No. 86,358.

*To all whom it may concern:*

Be it known that I, RICHIE DE LAN, a citizen of the United States, residing in Philadelphia, Pennsylvania, have invented certain Improvements in Lids for Cooking Utensils, of which the following is a specification.

My invention relates to that class of cooking utensil lids which are provided with a pane of glass or other transparent material in order to permit an inspection of the contents of the vessel without removing the lid or cover therefrom, the object of my invention being to so construct such a pot lid that while the transparent pane is properly secured in place under normal conditions it can be readily removed and replaced when from any reason such removal or replacement becomes necessary or desirable.

In the accompanying drawing—

Figure 1 is a perspective view of a cooking utensil lid constructed in accordance with my invention;

Fig. 2 is a transverse section of the same on the line 2—2, Fig. 1;

Fig. 3 is a transverse section on the line 3—3, Fig. 2, and

Fig. 4 is a view similar to part of Fig. 2, but illustrating a modification of my invention.

In the drawing, 11 represents a cooking utensil lid or cover having therein a central opening provided with a pane 12 of glass or other transparent material through which the contents of the vessel can be inspected without removing the lid therefrom, this transparent pane 12 resting upon a ledge 13 surrounding the opening in the lid and being normally retained in position by means of the pivot ends 14 of the bail 15 with which the lid is provided, said pivot ends of the bail being free to turn in bearings 16 secured to the lid in any desirable way, and said pivot ends of the bail projecting inwardly beyond said bearings to such an extent as to overlap the adjoining portions of the pane 12 and thus prevent removal of said pane from its seat in the lid.

In the present instance I have shown a retaining band 17 interposed between the members 14 of the bail and the pane 12 and extending around the periphery of said pane so as to exercise a restraining influence upon the same throughout all portions of said periphery, but this retaining band is not absolutely essential to my invention and may be omitted.

The bail 15 is usually composed of spring wire, and when for any reason it is desired to remove the pane 12 the side members of said bail can be readily bent inwardly, as shown by dotted lines in Fig. 2, until the pivot members 14 thereof are withdrawn from their bearings 16, whereupon the bail can be removed and the pane 12 and its retaining band 17 are then free to be lifted from the lid, the reinsertion of the pane or the substitution of another pane therefor being effected with equal readiness by a reversal of these operations.

In the drawing, I have shown the lid as provided with a transparent pane of circular form, but, as will be evident, the shape of the pane constitutes no part of my invention and may be varied as desired without departing therefrom.

I am aware that previous to my invention cooking utensil lids have been provided with panes of transparent material in order to permit inspection of the contents of the vessel without removing the lid, but so far as I know such panes have been permanently secured in place; hence, in case the pane is broken the lid must be discarded. By simply seating the pane in the lid and providing releasable retaining means therefor I am enabled to readily replace with another a pane which becomes broken or for any other reason incapable of performing its intended function.

While I prefer, in all cases, to cause the pivot members 14 of the bail 15 to act as locking bolts for the pane 12 means other than the springing of the side members of the bail may be adopted for the purpose of releasing them from the lid, for instance, when the bearings 16 for said pivot members simply consist of strips of sheet metal embracing the pivot members on the top of the lid and having side wings 16ª bent outwardly and bearing against the under side of the lid, as shown in Fig. 3, the bearings 16 may be removed with the bail by simply bending together the wings 16ª until they are free from engagement with the under side of the lid so as to release the bearings 16 therefrom, and when this method of removal is adopted the bearings 16 may be permitted to project over the retainer 17, as shown in Fig. 4.

I claim:

1. A cooking utensil lid having an opening therein, a cover for said opening, a handle having a bail with laterally projecting ends and bearings in which said projecting ends can turn so as to serve as pivots for the handle, portions of said laterally projecting ends coincident with the pivotal axis of the bail overlapping and bearing upon said cover whereby they serve to retain the latter in position upon the lid in all positions of adjustment of the handle.

2. A cooking utensil lid having an opening therein, a cover for said opening, a handle having a bail with elastic arms whose lower ends project laterally outward, bearings on the lid in which said outwardly projecting ends of the bail can swing so as to serve as pivots for the handle, said laterally projecting portions of the bail extending inwardly over the edges of the cover for the opening in the lid, and said bail being elastic so that its laterally projecting ends can be sprung inwardly to free them from said bearings and to permit removal of the handle and freeing of said cover.

In testimony whereof, I have signed my name to this specification, in the presence of two subscribing witnesses.

RICHIE DE LAN.

Witnesses:
KATE A. BEADLE,
HAMILTON D. TURNER.

Copies of this patent may be obtained for five cents each, by addressing the "Commissioner of Patents, Washington, D. C."